(12) United States Patent
Haeberer et al.

(10) Patent No.: US 6,230,842 B1
(45) Date of Patent: May 15, 2001

(54) METHOD AND APPARATUS FOR LUBRICATING THE TEETH OF A GEAR UNIT

(75) Inventors: Rainer Haeberer, Bretten; Uwe Kuhn, Riederich; Christoffer Uhr, Bruchsal; Sandro Soccol, Bietigheim-Bissingen, all of (DE); Thomas Lettner, Hallein; Hanspeter Mayer, Adnet, both of (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/348,580

(22) Filed: Jul. 7, 1999

(30) Foreign Application Priority Data

Jul. 7, 1998 (DE) ............................................. 198 30 301

(51) Int. Cl.⁷ .................................................. F16H 57/04
(52) U.S. Cl. .......................................................... 184/6.12
(58) Field of Search .................... 74/467, 468; 184/6.12, 184/6.13, 11.4, 10; 475/159

(56) References Cited

U.S. PATENT DOCUMENTS

| 1,143,307 | 6/1915 | Noyes ................................. 184/11.1 |
| 3,407,902 | * 10/1968 | Musser ................................ 184/6.12 |
| 3,762,503 | * 10/1973 | Wilder et al. ....................... 184/6.12 |
| 3,821,908 | 7/1974 | Marsch et al. ....................... 475/159 |
| 4,095,675 | * 6/1978 | Bell ..................................... 184/6.12 |
| 4,235,127 | * 11/1980 | Kemper ................................ 475/159 |
| 4,378,711 | * 4/1983 | Daniel .................................... 74/467 |
| 4,489,626 | * 12/1984 | Lemon ........................... 184/6.12 X |

FOREIGN PATENT DOCUMENTS

| 3410977 C2 | 9/1985 | (DE) . |
| 0 366 032 | 5/1990 | (DE) . |
| 0513840A1 | 11/1992 | (EP) . |
| 590867 | 7/1947 | (GB) . |
| 642791 | 2/1948 | (GB) . |
| 842909 | 3/1958 | (GB) . |

* cited by examiner

Primary Examiner—Rodney H. Bonck
Assistant Examiner—Ankur Parekh
(74) Attorney, Agent, or Firm—Ronald E. Greigg; Edwin E. Greigg

(57) ABSTRACT

The invention relates to a method for lubricating the teeth of a gear unit having a hollow wheel with an inner set of teeth and at least one pinion with an outer set of teeth that meshes with the inner set of teeth, and a gear unit with a hollow wheel with an inner set of teeth and at least one pinion with an outer set of teeth, which meshes with the inner set of teeth. To assure reliable supply of lubricant to the teeth during the operation of the gear unit, the invention proposes that the lubricant is introduced in a targeted way into the interior of the hollow wheel. The invention further proposes a gear unit, which has a device for the targeted delivery of lubricant into the interior of the hollow wheel.

16 Claims, 2 Drawing Sheets

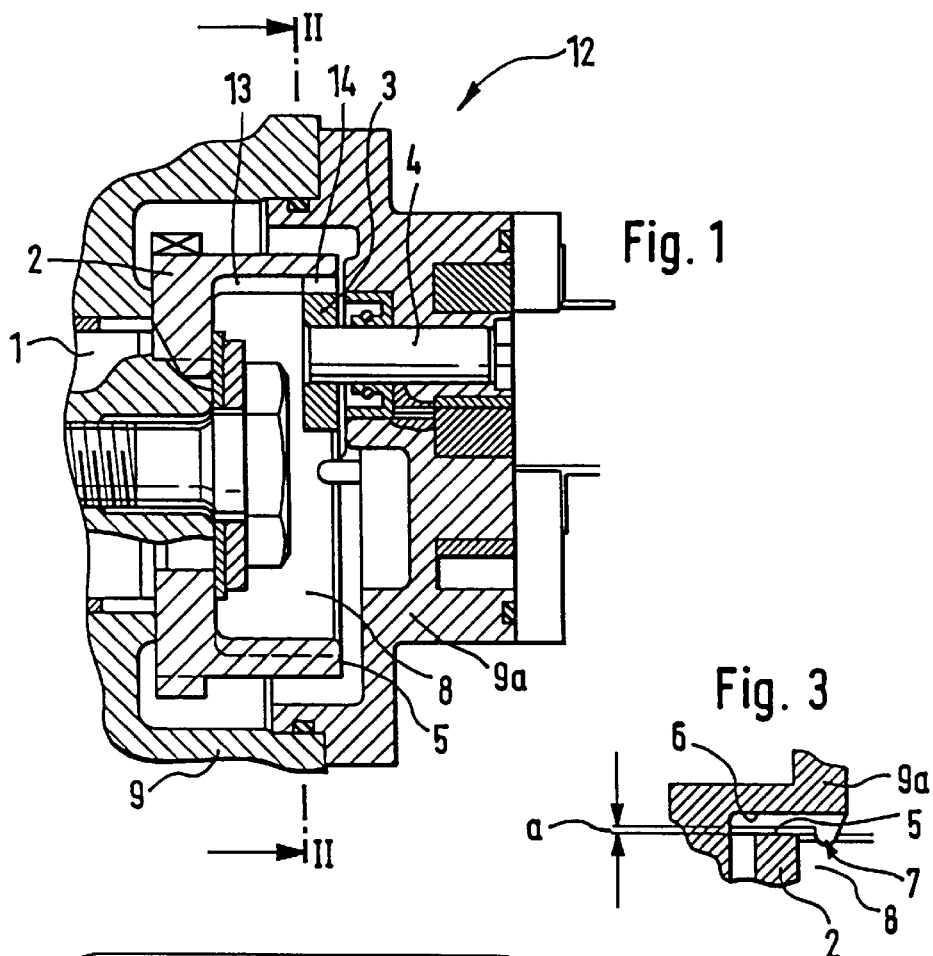
Fig. 1
Fig. 3
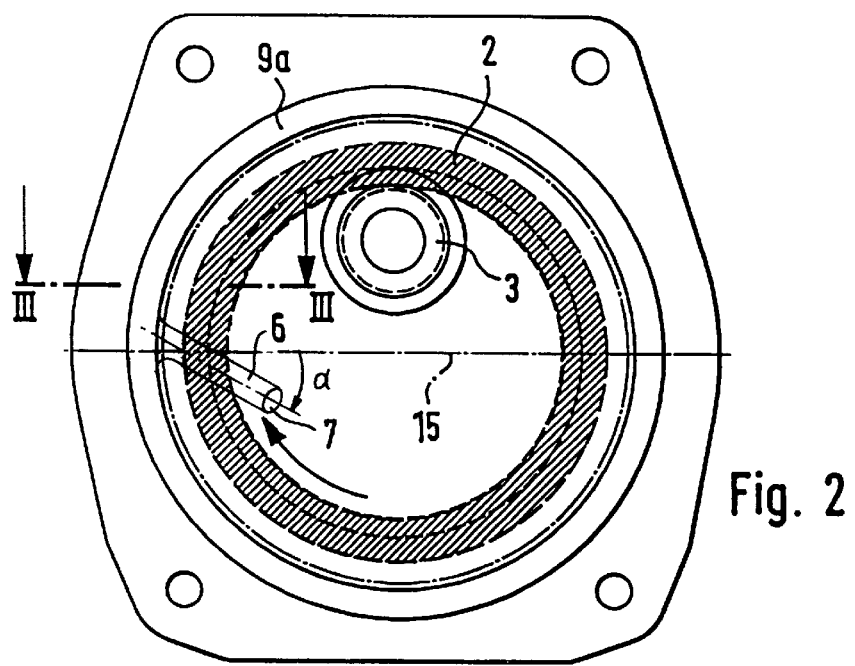
Fig. 2

METHOD AND APPARATUS FOR LUBRICATING THE TEETH OF A GEAR UNIT

BACKGROUND OF THE INVENTION

The present invention relates to a method for lubricating the teeth of a gear unit having a hollow wheel with an inner set of teeth and at least one pinion with an outer set of teeth that meshes with the inner set of teeth. The present invention also relates to a gear unit with a hollow wheel with an inner set of teeth and at least one pinion with an outer set of teeth.

Gear units with a hollow wheel with an inner set of teeth and a pinion with an outer set of teeth are used in the prior art to connect two gear shafts with a relatively slight axial spacing, whose rotary speed to one another is to be stepped up at a certain ratio.

The toothing between the inner set of teeth and outer set of teeth must be lubricated with lubricant for the sake of lubrication and to dissipate heat from the teeth. In the known gear units, the lubrication of the teeth is done by placing the teeth in an oil bath. By the centrifugal action of the hollow wheel during operation of the gear unit, however, the entry of the oil into the interior of the hollow wheel and into the teeth is made considerably more difficult. In the known gear units, the lubrication of the teeth is therefore not optimal, even though the teeth are in an oil bath. Inadequate lubrication of the teeth can lead to increased wear and abrasion of the teeth and increased heat production in the region of the teeth. Over the long term, this can mean failure of the gear unit and can entail considerable cost for replacing the defective gear unit with a new one and repairing the defective gear unit.

OBJECT AND SUMMARY OF THE INVENTION

It is accordingly an object of the present invention to refine a method for lubricating the teeth of a gear unit of the type defined at the outset in such a way that the lubrication of the teeth is improved considerably and thus the service life of gear units lubricated by this method is prolonged.

To attain this object, the invention, taking as the point of departure a method for lubricating the teeth of a gear unit as defined at the outset, proposes that the lubricant is introduced in a targeted way into the interior of the hollow wheel.

According to the invention, it has been discovered that optimal lubrication of the teeth between the inner set of teeth of the hollow wheel and the outer set of teeth of the pinion, because of the centrifugal force acting in the hollow wheel, can be attained only by means of a targeted delivery of lubricant into the interior of the hollow wheel.

In the lubricating method of the invention, despite the centrifugal action of the hollow wheel, it can be assured that access to the teeth for the lubricant is possible. Thus, even at high rotary speeds of the hollow wheel and thus, a strong centrifugal action, optimal lubrication of the teeth and heat dissipation from the teeth is always assured. The service life of gear units that are lubricated by this method can be lengthened decisively thereby.

In an advantageous feature of the invention, it is proposed that oil is used as the lubricant. Oil of an arbitrary composition and viscosity can be used.

Another object of the present invention is to further refine a gear unit of the type defined at the outset in such a way that improved lubrication of the teeth is attained and the service life of the gear unit can be lengthened thereby.

To attain this object, the invention, taking a gear unit of the type defined at the outset as its point of departure, proposes that the gear unit has means for the targeted delivery of lubricant into the interior of the hollow wheel.

In this way, access to the teeth is made possible for the lubricant at all times, and optimal lubrication and heat dissipation from the teeth are assured.

The means for the targeted delivery of lubricant can be embodied in arbitrary ways. Conceivable examples are passive means, which assure a targeted delivery of the lubricant into the interior of the hollow wheel on the basis of the structural design of the gear unit. Active means are also conceivable, however, which for instance by means of pumps assure a targeted delivery of the lubricant into the interior of the hollow wheel.

In an advantageous refinement of the invention, in the interior of the gear housing, facing the end face of the hollow wheel at a distance a from this end face, at least one squeegee strip is disposed on the gear housing.

During the operation of the gear unit, the lubricant, sticking by adhesion to the end face of the hollow wheel, is scraped off at the squeegee strip as a result of rotation of the hollow wheel and reaches the interior of the hollow wheel. The spacing a between the squeegee strip and the end face of the hollow wheel must be selected such that on the one hand it is great enough to enable unhindered rotation of the hollow wheel and on the other: is slight enough that the largest possible proportion of the lubricant sticking to the end face will be scraped off at the squeegee strip by the rotation of the hollow wheel and will reach the interior of the hollow wheel. On the distal end of the squeegee strips, a drip edge that protrudes into the interior of the hollow wheel is advantageously embodied. The drip edge can protrude arbitrarily far into the interior and thus assures that the scraped-off lubricant reaches as far as possible into the interior of the hollow wheel, and as a result as much lubricant as possible is available in the region of the teeth for the sake of lubrication and heat dissipation.

In an advantageous refinement of the invention, the action of the squeegee strips can be increased by providing that the squeegee strips are disposed in an angular range from +45° to −450° relative to a straight line that passes through the center point of the hollow wheel. The angles that extend counterclockwise from the line passing through the center point have a positive sign. The angles that extend clockwise from the straight line passing through the center point conversely have a negative sign. The inclination of the squeegee strips relative to the straight line depends in particular on the direction of rotation of the hollow wheel. Other criteria for the selection of a particular angle of inclination of the squeegee strips relative to the straight line passing through the center point can be the position in which the gear unit has been installed, or the speed at which the hollow wheel rotates.

Advantageously, the squeegee strips are disposed in an angle from +25 ° or −25 ° relative to a straight line that passes through the center point of the hollow wheel. Upon rotation of the hollow wheel in a clockwise direction, the gear unit advantageously has a squeegee strip which is disposed at an angle of −25° relative to a straight line that passes through the center point of the hollow wheel.

If the hollow wheel rotates in both directions, then advantageously the gear unit has two squeegee strips, of which one squeegee strip is disposed at an angle of +25° relative to a straight line that passes through the center point of the hollow wheel, and the other is disposed at an angle of −25° relative to a straight line that passes through the center point of the hollow wheel. In this way, it is assured that the lubricant sticking to the end face is optimally scraped off by one of the squeegee strips in both directions of rotation of the hollow wheel and will reliably reach the interior of the hollow wheel.

In another advantageous refinement of the invention, it is proposed that the hub of the hollow wheel has at least one bore, which connects the interior of the hollow wheel to an annular chamber, which is defined by the shaft, connected to the hollow wheel, and the housing of the gear unit and is part of a central pressurized lubricant supply. In this embodiment of the invention, the lubricant is delivered by targeted feeding from the lubricant-carrying annular chamber belonging to the central pressurized lubricant supply into the interior of the hollow space, via the bore in the hub of the hollow wheel. Because of the centrifugal force of the hollow wheel, the delivered lubricant is forced outward into the teeth during the operation of the gear unit of the invention and there assures optimal lubrication and heat dissipation.

Advantageously, the quantity of lubricant to be fed out of the annular chamber into the interior of the hollow wheel is defined by the diameter of the bore. As a result, the quantity of lubricant to be fed can be controlled by the choice of the size of the bore.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows a gear unit of the invention in a first embodiment in longitudinal section;

FIG. 2 shows the gear unit of the invention from FIG. 1 in a cross section taken along the line II—II;

Fig. 3 shows a detail of the gear unit of the invention from FIGS. 1 and 2 in a view along the line III—III;

DESCRIPTION THE PREFERRED EMBODIMENTS

Figure 4:
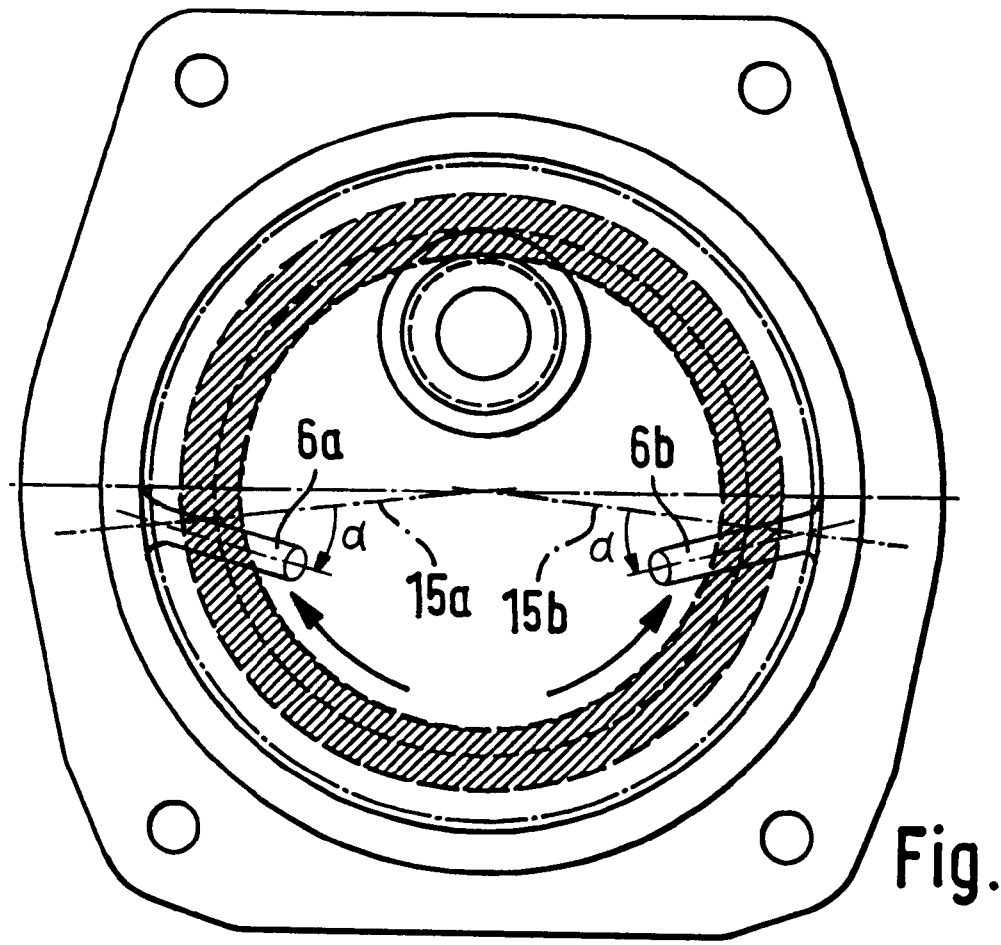
FIG. 4 shows a gear unit of the invention in a second embodiment in cross section.

In FIG. 1, gear unit in a first embodiment is identified overall by reference numeral 12. The gear unit 12 has a shaft 1, to which a hollow wheel 2 is secured. The hollow wheel 2, via an inner set of teeth 13, drives a pinion 3 whose outer set of teeth 14 meshes with the inner set of teeth 13. The pinion 3 is secured to a shaft 4. The gear unit 12 is used to connect two gear shafts 1, 4, with a relatively slight axial spacing, whose relative rpm is to be stepped up at a certain ratio.

Facing an end face 5 of the hollow wheel 2, a squeegee strip 6 is mounted in stationary fashion at a distance a on the housing 9a of the gear unit 12. The squeegee strip 6 is inclined by an angle α to a straight line 15 that passes through the center point of the hollow wheel 2. The direction of rotation of the hollow wheel 2 shown in FIG. 2 is clockwise. The squeegee strip 6 shown in FIG. 2 is inclined by the angle −25° relative to the straight line 15 passing through the center point.

During operation of the gear unit 12, the oil sticking by adhesion to the end face 5 is scraped off at the squeegee strip 6 by the rotation of the hollow wheel 2. On its distal end, the squeegee strip 6 has a drip edge 7, which protrudes into the hollow space 8 of the hollow wheel 2 (see FIG. 3).

The oil scraped off from the end face 5 reaches the interior 8 of the hollow wheel 2 via the drip edge 7.

To enable reliable delivery of oil to the teeth at all times, regardless of the directions of rotation of the shafts 1, 4 or of the hollow wheel 2, in the embodiment of FIG. 4 two squeegee strips 6 a, 6 b are mounted on the housing 9 a of the gear unit 12. The squeegee strip 6 a is disposed with an incline of an angle of −25 ° relative to a straight line 15 athat passes through the center point of the hollow wheel 2. The squeegee strip 6 bis inclined by an angle of +25° relative to a straight line 15 b that passes through the center point of the hollow wheel 2.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for lubricating the teeth of a gear unit (12) which is mounted inside a gear housing, said gear unit having a hollow wheel (2) which includes an end face and an inner set of teeth (13) and at least one pinion (3) which includes an outer set of teeth (14) that meshes with the inner set of teeth (13), which comprises, during rotation of the hollow wheel (2), introducing the lubricant sticking to an end face (5) of the hollow wheel (2) into the interior (8) of the hollow wheel (2) by means of at least one squeegee strip (6) which is disposed on the gear housing (9 a) interior of the gear housing (9, 9 a), facing the end face (5) of the hollow wheel (2) at a distance (a) from said end face (5).

2. The method according to claim 1, in which oil is used as the lubricant.

3. A gear unit (12) having a gear housing, comprising a hollow wheel (2) which includes an end face and an inner set of teeth (13) and at least one pinion (3) which includes an outer set of teeth (14), in which the gear unit (12) has at least one squeegee strip (6) for a targeted delivery of lubricant into the interior (8) of the hollow wheel (2) and in which the at least one squeegee strip (6) is disposed on the gear housing (9 a) interior of the gear housing (9, 9 a), facing the end face (5) of the hollow wheel (2) at a distance (a) from said end face.

4. The gear unit according to claim 3, in which oil is used as the lubricant.

5. The gear unit (12) according to claim 4, in which a distal end of the squeegee strips (6) has a drip edge (7) is and said distal end of the squeegee strip (6) protrudes into the interior (8) of the hollow wheel (2).

6. The gear unit (12) according to claim 5, in which the at least one squeegee strip (6) is disposed within an angular range of from +25° to −25° relative to a straight line (15) that passes through the center point of the hollow wheel (2).

7. The gear unit (12) according to claim 4, in which the at least one squeegee strip (6) is disposed within an angular range of from +45° to −45° relative to a straight line (15) that passes through a center point of the hollow wheel (2).

8. The gear unit (12) according to claim 3, in which a distal end of the at least one squeegee strip (6) has a drip edge (7), and said distal end of the at least one squeegee strip (6) protrudes into the interior (8) of the hollow wheel (2).

9. The gear unit (12) according to claim 8, in which the at least one squeegee strip (6) is disposed within an angular range of from +45° to −45° relative to a straight line (15) that passes through a center point of the hollow wheel (2).

10. The gear unit (12) according to claim 8, in which the at least one squeegee strip (6) is disposed within an angular range of from +25° to −25° relative to a straight line (15) that passes through the center point of the hollow wheel (2).

11. The gear unit (12) according to claim 10, in which the at least one squeegee strip comprises one squeegee strip (6), which is disposed at an angle of −25° relative to a straight line (15) that passes through the center point of the hollow wheel (2).

12. The gear unit (12) according to claim 11, in which the at least one squeegee strip (6) comprises first and second squeegee strips (6a, 6b), of which said first squeegee strip (6a) is disposed at an angle of −25° relative to a straight line (15a) that passes through the center point of the hollow wheel (2), and the second squeegee strip (6b) is disposed at an angle of −25° relative to a straight line (15b) that passes through the center point of the hollow wheel (2).

13. The gear unit (12) according to claim 10, in which the at least one squeegee strip (6) comprises first and second squeegee strips (6a, 6b), of which said first squeegee strip (6a) is disposed at an angle of −25° relative to a straight line (15a) that passes through the center point of the hollow wheel (2), and the second squeegee strip (6b) is disposed at an angle of +25° relative to a straight line (15b) that passes through the center point of the hollow wheel (2).

14. The gear unit (12) according to claim 3 in which the at least one squeegee strip (6) is disposed within an angular range of from +45° to −45° relative to a straight line (15) that passes through a center point of the hollow wheel (2).

15. the gear unit (12) according claim 14, in which the at least one squeegee strip (6) is disposed within an angular range of from +25° to −25° relative to a straight line (15) that passes through the center point of the hollow wheel (2).

16. The gear unit (12) according to claim 15 in which the at least one squeegee strip (6) comprises first and second squeegee strips (6a, 6b), of which said first squeegee strip (6a) is disposed at an angle of −25° relative to a straight line (15a) that passes through the center point of the hollow wheel (2), and the second squeegee strip (6b) is disposed at an angle of +25° relative to a straight line (15 b) that passes through the center point of the hollow wheel (2).

* * * * *